(12) United States Patent
Neubauer (10) Patent No.: US 12,110,193 B2
(45) Date of Patent: Oct. 8, 2024

(54) TRANSPORT OF OBJECTS HAVING DIFFERENT FORMATS

(71) Applicant: KRONES AG, Neutraubling (DE)

(72) Inventor: Michael Neubauer, Grassau (DE)

(73) Assignee: KRONES AG, Neutraubling (DE)

( * ) Notice: Subject to any disclaimer, the term of this patent is extended or adjusted under 35 U.S.C. 154(b) by 85 days.

(21) Appl. No.: 17/985,522

(22) Filed: Nov. 11, 2022

(65) Prior Publication Data

US 2023/0150776 A1 May 18, 2023

(51) Int. Cl.
*B65G 47/90* (2006.01)
*B65B 43/46* (2006.01)

(52) U.S. Cl.
CPC ...... *B65G 47/90* (2013.01); *B65G 2201/0244* (2013.01); *B65G 2201/0252* (2013.01)

(58) Field of Classification Search
CPC ......... B65B 43/46; B65B 43/54; B65B 59/00; B65G 17/323; B65G 47/847; B65G 29/00; B65G 2201/0244; B65G 2201/0252; B65G 54/02; B65G 47/901; B65G 2201/0241; B65G 2201/025; B65G 47/90; B65G 47/907; B65C 9/02; B67C 3/24
USPC .......................................................... 198/619
See application file for complete search history.

(56) References Cited

U.S. PATENT DOCUMENTS

| | | | |
|---|---|---|---|
| 8,096,409 B2 * | 1/2012 | Wipf | B65G 19/02 198/805 |
| 8,894,473 B2 * | 11/2014 | Bachtle | A22C 11/008 452/51 |
| 9,403,611 B2 * | 8/2016 | Sacchetti | B65G 47/842 |
| 9,873,571 B2 * | 1/2018 | Hahn | B65G 47/082 |
| 11,097,908 B2 * | 8/2021 | Tanaka | B65G 43/10 |
| 2016/0176659 A1 * | 6/2016 | Aumann | B65G 54/02 198/619 |

(Continued)

FOREIGN PATENT DOCUMENTS

DE 2819622 A1 11/1979
DE 102017102914 A1 8/2018

(Continued)

OTHER PUBLICATIONS

English abstract of DE102018203626B3.
English abstract of DE2819622A1.

*Primary Examiner* — Gene O Crawford
*Assistant Examiner* — Muhammad Awais
(74) *Attorney, Agent, or Firm* — Caesar Rivise, PC (57) ABSTRACT

A device for transporting objects, preferably containers, along a transport path. A control unit is configured to operate the device in a first operating mode and in a second operating mode. In the first operating mode and in the second operating mode the objects are transported in each case by pairs which are formed in each case from one of the first movement devices and one of the second movement devices. In the first operating mode, the pairs are formed such that the first movement device is positioned in a direction of the transport path upstream of the second movement device of the respective pair. In the second operating mode, the positioning is reversed. The device advantageously makes it possible for different objects to be able to be transported without a mechanical adjustment relative to the format and for a relatively small spacing to be able to be achieved.

16 Claims, 3 Drawing Sheets

(56) References Cited

U.S. PATENT DOCUMENTS

| | | | | |
|---|---|---|---|---|
| 2019/0233152 A1* | 8/2019 | Nakamoto | ............ | B65B 51/32 |
| 2020/0002040 A1 | 1/2020 | Von Birgelen et al. | | |
| 2021/0009360 A1* | 1/2021 | Mulet Valles | ......... | B65G 54/02 |
| 2021/0163235 A1* | 6/2021 | Mezzaro | ............... | B65G 47/52 |
| 2021/0245960 A1* | 8/2021 | Kiessner | ................... | B61B 1/00 |
| 2021/0323773 A1* | 10/2021 | Boarin | .................. | B65G 47/04 |
| 2022/0411249 A1 | 12/2022 | Till | | |

FOREIGN PATENT DOCUMENTS

| | | | | |
|---|---|---|---|---|
| DE | 102018203626 B3 | 8/2019 | | |
| DE | 2019104088 A1 | 8/2020 | | |
| DE | 102019104088 A1 * | 8/2020 | ........... | B65G 47/681 |
| EP | 2653036 A1 | 10/2013 | | |
| EP | 3109189 A1 | 12/2016 | | |
| EP | 3744649 A1 * | 12/2020 | ............ | B65B 43/12 |
| EP | 3907162 A1 | 11/2021 | | |
| WO | WO-2016064950 A1 * | 4/2016 | ............ | B61B 10/02 |
| WO | WO-2019159116 A1 * | 8/2019 | ............... | B65C 9/04 |
| WO | WO2019/179685 A1 | 9/2019 | | |
| WO | WO-2021153327 A1 * | 8/2021 | | |
| WO | WO-2021200534 A1 * | 10/2021 | | |

\* cited by examiner

TRANSPORT OF OBJECTS HAVING DIFFERENT FORMATS

CROSS REFERENCE TO RELATED APPLICATIONS

This application claims the benefit under 35 U.S.C. § 119(a) of German Patent Application No. DE 10 2021 129 702.8 filed Nov. 15, 2021 entitled TRANSPORT OF OBJECTS HAVING DIFFERENT FORMATS, and whose entire disclosure is incorporated by reference herein.

TECHNICAL FIELD

The invention relates to devices and methods for transporting objects, preferably containers.

TECHNICAL BACKGROUND

Container treatment systems generally consist of a series of different treatment stations arranged one after the other. The containers are subjected to different treatments at these treatment stations. This can refer to a filling, closing or labelling process. Several options exist for the transport of the containers between the stations. There are machines which work in a clocked manner as are used, for example, for the production of beverage cartons. Here the transport of the containers is generally carried out by a production chain. In machines for filling beverage containers, generally transfer stars which transport the containers through the system are used.

A current development trend in the transport of containers, such as for example bottles or cans, in systems and machines for the production, filling and packaging of beverages and liquid food products, is linear motor technology, for example in the form of long stator linear motor systems or short stator linear motor systems. In a long stator linear motor system, a fixed long stator can be used with electromagnets for bringing about a movement of the movement devices provided with permanent magnets. In short stator linear motor systems, however, the movement devices can have in each case a short stator formed by electromagnets which can come into a magnetically operative connection with fixed permanent magnets for moving the movement device. The movement devices, which are also called a "shuttle" or "mover", can in each case move one or more containers. A great advantage of the linear motor technology is that the movement devices can be controlled individually or separately and independently of one another.

WO 2019/159116 A1 discloses a machine for treatment or conveying containers, having a guide which extends in a feed direction for feeding the containers and a plurality of carriages for carrying the containers, which are attached so as to slide one behind the other on the same guide. The guide and each carriage together define corresponding linear motors. Each support carriage comprises, in particular, two gripping means which are mounted in each case on different and successive carriages along the same guide. The carriages are movable toward one another or away from one another in order to regulate the mutual spacing in the feed direction for feeding the containers, and to define a gripping region of the gripping means therebetween as a function of the type of container to be removed or released.

EP 3 109 189 A1 discloses a transfer device for transporting a series of packaging units along a transfer path. The transfer device comprises a first circulating carrier which has at least one operative branch parallel to the transfer path, at least one first conveying element which is moved forward along the first circulating carrier, a second circulating carrier which adjoins the first circulating carrier and at least one operative branch parallel to the transfer path, and at least one second conveying element which is controlled independently of the first conveying element and is moved forward along the second circulating carrier. The first conveying element and the second conveying element are configured such that in each case they hold a packaging unit therebetween and move such a packaging unit forward along the transfer path.

The object of the invention is to develop the above-described techniques such that, without refitting the device, objects, preferably containers having different formats, can be transported in a simple manner, preferably with the smallest possible spacing.

SUMMARY OF THE INVENTION

The object is achieved by the features of the independent claims. Advantageous developments are specified in the dependent claims and the description.

One aspect of the present disclosure relates to a device for transporting objects, preferably containers, along a transport path having at least one (for example closed or circulating) guide track. The device further has first movement devices and second movement devices for transporting the objects. The first movement devices and the second movement devices are guided and individually drivable along the at least one guide track alternately one behind the other, preferably via a long stator linear drive or a short stator linear drive. The device also has a control unit which is configured to operate the device in a first operating mode and in a second operating mode. In the first operating mode and in the second operating mode, the objects are transported in each case by pairs which are formed in each case from one of the first movement devices and one of the second movement devices. In the first operating mode, the pairs are formed such that the first movement device is positioned in a direction of the transport path upstream of the second movement device of the respective pair. In the second operating mode the pairs are formed such that the second movement device is positioned in the direction of the transport path upstream of the first movement device of the respective pair.

Advantageously, the device makes it possible for very different objects, preferably containers, to be able to be transported without a mechanical adjustment relative to the format on the movement devices. Additionally, a relatively small spacing (interval between the objects transported one after the other) can be achieved, which is important for a high machine output. With a change of format, the cooperation of the movement devices for transporting the objects can be changed. For a first group of objects, for example small containers, the device can be operated in the first operating mode. For a second group of objects, for example large containers, the device can be operated in the second operating mode. For changing the format, it is possible to change between the first and the second operating mode without time-consuming and cost-intensive mechanical refitting of the device being required. The change of format can thus be carried out in a simple manner purely in terms of control technology by changing the operating mode.

For example, the first movement devices and the second movement devices can be configured to transport the objects in a manner where said objects are suspended, carried or slide over a bottom surface.

Preferably, the first movement devices and the second movement devices are guided along the same guide track.

In one exemplary embodiment, the control unit is configured to operate the device for transporting objects having a first format in the first operating mode and for transporting objects having a second format, which differs from the first format, preferably in a shape and/or a size, in the second operating mode.

In a further exemplary embodiment, the first movement devices and the second movement devices differ from one another, preferably relative to an arrangement and/or a configuration of a support for the objects. Advantageously, the first movement devices and the second movement devices can thus be adapted to very different formats and/or permit a very small spacing during transport, even though the objects can be relatively large.

It is also possible that the first movement devices and the second movement devices are structurally the same but aligned differently relative to the at least one guide track, wherein preferably the second movement devices are rotated by substantially 180° about one respective pitch axis of the second movement devices relative to the first movement devices.

In a further exemplary embodiment, the first movement devices and the second movement devices have in each case a first, preferably V-shaped, ring segment-shaped or planar, support portion which is oriented in the direction of the transport path and a second, preferably V-shaped, ring segment-shaped or planar, support portion which is oriented opposing the direction of the transport path, for supporting the objects during transport. Preferably, in the first operating mode the objects are supported in each case between the second support portion of the first movement devices and the first support portion of the second movement devices. Alternatively or additionally, in the second operating mode the objects are supported in each case between the first support portion of the first movement devices and the second support portion of the second movement devices.

Preferably, in the first operating mode the second support portion of the first movement device and the first support portion of the second movement device of the respective pair face one another.

Preferably, in the second operating mode the first support portion of the first movement device and the second support portion of the second movement device of the respective pair face one another.

In one embodiment, the first support portions of the first movement devices and the second support portions of the first movement devices are designed structurally differently. Preferably, the first support portions of the second movement devices are designed structurally in the manner of the second support portions of the first movement devices and/or the second support portions of the second movement devices are designed structurally in the manner of the first support portions of the first movement devices. Advantageously, for example, it can be achieved thereby that objects having very different formats, for example containers having a conical shape and containers having a cylindrical shape, can be transported equally by the device. For example, the containers having a conical shape can be transported in the first operating mode. The containers having a cylindrical shape can in turn be transported in the second operating mode.

In a further embodiment, the first support portions of the first movement devices, the second support portions of the first movement devices, the first support portions of the second movement devices and/or the second support portions of the second movement devices are designed structurally the same. Advantageously, in these embodiments the structural design of the portions can be such that different formats of objects can be supported by the same support portions for the transport.

In a further embodiment, the first support portions of the first movement devices are set back relative to the direction of the transport path and/or the second support portions of the second movement devices are set back relative to a direction opposing the direction of the transport path. Alternatively or additionally, the second support portions of the first movement devices can precede in a direction opposing the direction of the transport path and/or the first support portions of the second movement devices can precede relative to the direction of the transport path. Advantageously, when transporting large objects, a small spacing can be achieved thereby.

In one variant, the first movement devices and the second movement devices in each case have a carrier arm which carries the first support portion and the second support portion of the respective movement device, preferably at the same end of the carrier arm. Preferably, the carrier arms of the first movement devices and the carrier arms of the second movement devices can be bent back in opposing directions to one another. Advantageously, the bent-back portion of the carrier arms thus can be oriented outwardly in the second operating mode, for example in the case of large objects. In the case of small objects, the bent-back portion of the carrier arms can be oriented inwardly in the first operating mode. In this manner, even with large containers, a spacing can be achieved which is considerably smaller than that which can be achieved with a rigid assignment of the movement devices.

A further aspect of the present disclosure relates to a device for transporting objects, preferably containers, along a transport path, having at least one (for example closed or circulating) guide track. The device has a plurality of movement devices for transporting the objects, wherein the plurality of movement devices are guided and individually drivable along the at least one guide track, preferably via a long stator linear drive or a short stator linear drive. The device has a control unit which is configured to control the plurality of movement devices such that in each case a group consisting of at least three of the plurality of movement devices together transport an object positioned, preferably secured, therebetween along the transport path to a transfer region of the device for the transfer of the object.

Advantageously, the device can enable a very high degree of flexibility to be able to be achieved in the formats which can be transported without refitting the movement devices. By the plurality of contact points with the object, almost any contour can be transported by the at least three movement devices. In turn, an adjustment relative to the format can be carried out in a simple manner purely in terms of control technology by changing the arrangement of the movement devices to one another. A time-consuming and cost-intensive mechanical refitting of the movement devices when changing the format can be dispensed with.

In one exemplary embodiment, the control unit is configured such that the groups are formed in each case from exactly three of the plurality of movement devices, wherein the object is preferably supported or carried in a three-point bearing of the exactly three movement devices of the respective group, preferably on a peripheral surface or lateral surface of the object. Advantageously, a minimal possible spacing can be reduced thereby and it is also possible that a plurality of movement devices are not used unnecessarily for transporting an object.

In a further exemplary embodiment, the at least one guide track has a first guide track and a second guide track which extend substantially in parallel and are arranged one above the other. The control unit is configured to form a first group of the groups such that one of the three movement devices of the first group is guided on the first guide track and the other two of the three movement devices of the first group are guided on the second guide track. The control unit is also configured to form a second group of the groups, preferably directly following the first group, such that two of the three movement devices of the second group are guided on the first guide track and the other of the three movement devices of the second group is guided on the second guide track. Advantageously, a minimal possible spacing can be reduced particularly effectively thereby, since successive objects can be transported very adjacent to one another.

Preferably, in a plan view of the device or the groups from above, the first group and the second group can overlap with one another during the transport.

In a further exemplary embodiment, the control unit is configured such that the groups are formed in each case from exactly four of the plurality of movement devices, wherein the object is preferably supported or carried in a four-point bearing by the exactly four movement devices of the respective group, preferably on a peripheral surface or lateral surface of the object. Advantageously, the four-point bearing can permit a particularly high degree of flexibility relative to possible contours of transportable objects.

Preferably, the at least one guide track can have a first guide track and a second guide track which extend substantially in parallel and are arranged one above the other. The control unit can preferably be configured to form the groups such that, for each group, two of the four movement devices are guided on the first guide track and the two other of the four movement devices are guided on the second guide track.

A further aspect of the present disclosure relates to a container treatment system for treating containers, having a device as disclosed herein. Advantageously, it can be made possible by the device that the achievable spacing (interval) of the container treatment stations of the container treatment system can be minimized since this can be adapted to a minimum achievable spacing during the transport of the objects by the device or can correspond thereto. As explained above, the device can permit the movement devices to be able to be moved very closely together for achieving a small spacing, in order to keep the interval, for example, between two successive filling valves as small as possible.

Preferably, the container treatment system can be configured for producing, cleaning, coating, testing, filling, closing, labelling, printing and/or packaging containers for liquid media, preferably beverages or liquid food products.

For example, the containers can be designed as bottles, cans, canisters, cartons, flasks, etc.

Preferably, the container treatment system can have a plurality of treatment stations (for example filling stations, closing stations and/or labelling stations) for the containers transported by the device, wherein the plurality of treatment stations are arranged along the at least one guide track. If, for example, in a filling machine a plurality of filling valves, for example five thereof, are positioned one behind the other on the guide track, via the device a plurality of containers, for example five thereof, can be moved continuously below these filling valves at the same time and filled there. After terminating the filling process, the device moves the plurality of filled containers, or five thereof, onward and a plurality of new empty containers, or five thereof, are moved by the device below the filling valves. Since the device permits a very small spacing or a very small spacing interval, the change can require relatively little time, so that the output can be increased.

Preferably, the term "control unit" can refer to an electronics system (for example designed as a driver circuit or with microprocessor(s) and a data store) which, depending on the configuration, can undertake control tasks and/or regulating tasks and/or processing tasks. Even if the term "control" is used herein, expediently "regulating" or "control with feedback" and/or "processing" can also be encompassed or understood thereby.

A further aspect of the present disclosure relates to a method for transporting objects, for example containers, having different formats via a device, preferably as disclosed herein, which has at least one (for example closed or circulating) guide track and first movement devices and second movement devices for transporting the objects, wherein the first movement devices and the second movement devices are guided and individually drivable along the at least one guide track alternately one behind the other, preferably via a long stator linear drive or a short stator linear drive. The method comprises transporting an object having a first format via a pair consisting of one of the first movement devices and one of the second movement devices (for example in the first operating mode and/or controlled by a control unit of the device), wherein the first movement device is positioned in a direction of the transport path upstream of the second movement device of the pair. The method comprises transporting an object having a second format which differs from the first format, preferably in a size and/or in a shape, via a pair consisting of one of the first movement devices and one of the second movement devices (for example in the second operating mode and/or controlled by a control unit of the device), wherein the second movement device is positioned in the direction of the transport path upstream of the first movement device of the pair. Advantageously, by means of the method it is possible to achieve the same advantages which have already been described relative to the corresponding device.

A further aspect of the present disclosure relates to a method for transporting objects, preferably containers, having different formats via a device, preferably as described herein, which has at least one (for example closed or circulating) guide track and a plurality of movement devices for transporting the objects along a transport path, wherein the plurality of movement devices are guided and individually drivable along the at least one guide track, preferably via a long stator linear drive or short stator linear drive. The method comprises transporting objects having different formats, in each case via a group consisting of at least three movement devices (for example exactly three or exactly four movement devices) which together position, preferably secure, an object therebetween along the transport path as far as a transfer region of the device for transferring the object, wherein for transporting the object an arrangement of the at least three movement devices to one another is set as a function of one respective format of the object to be transported, preferably for achieving a (for example flexible) three-point bearing or a (for example flexible) four-point bearing. Advantageously, by means of the method it is possible to achieve the same advantages which have already been described relative to the corresponding device.

Expressions used herein, which refer to a relation relative to the direction of the transport path, are preferably to be understood to mean that the aforementioned relation refers to the direction of that portion of the transport path on which the respective movement device is positioned.

The preferred embodiments and features of the invention described above are able to be combined together in any manner.

BRIEF DESCRIPTION OF THE FIGURES

Further details and advantages of the invention are described hereinafter with reference to the accompanying drawings. In the drawings.

The embodiments shown in the figures at least partially coincide such that similar or identical parts are provided with the same reference numerals and for the explanations thereof reference is made to the description of the other embodiments or figures, in order to avoid repetition.

DETAILED DESCRIPTION OF EXEMPLARY EMBODIMENTS

Figure 1:
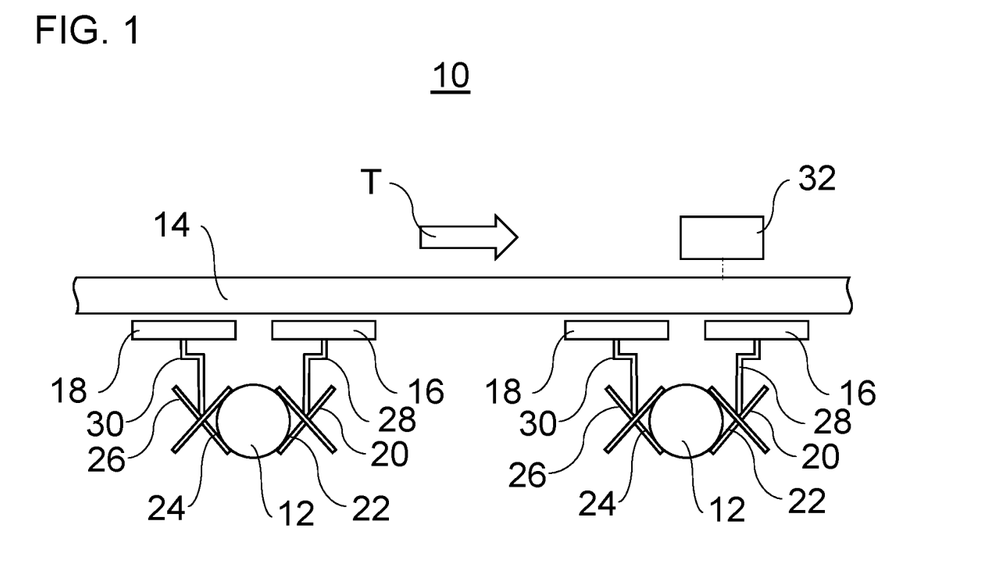
FIG. 1 shows a plan view of a portion of a device for transporting objects in a first operating mode according to an exemplary embodiment of the present disclosure.
Figure 2:
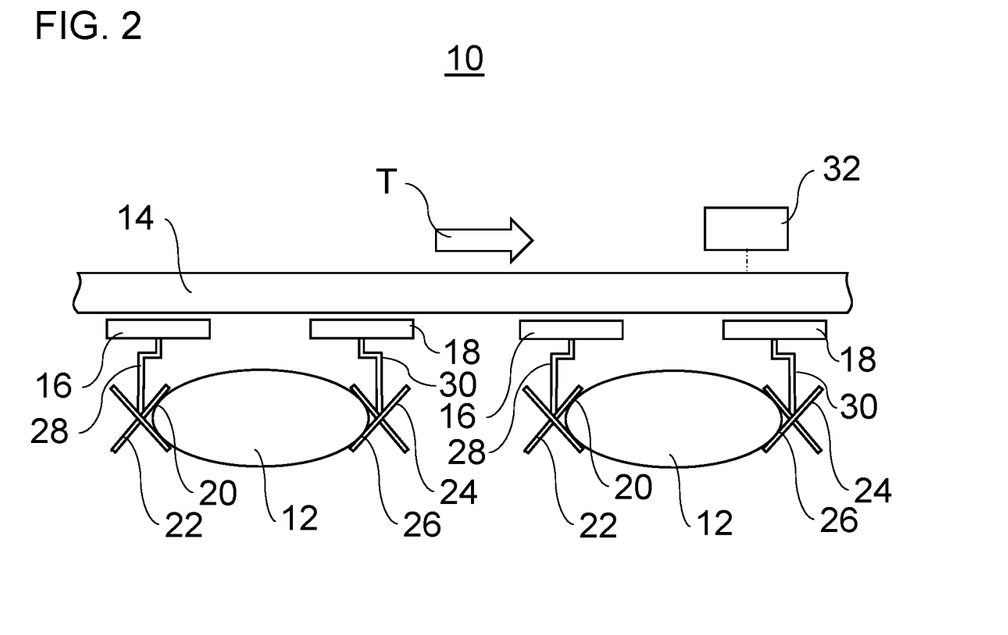
FIG. 2 shows a plan view of the portion of the device of FIG. 1 in a second operating mode according to an exemplary embodiment of the present disclosure.

FIGS. 1 and 2 show a portion of a device 10 for transporting objects 12 along a transport path or in a transport direction T.

The objects 12 are preferably designed as containers. However, other objects 12 can also be transported. Particularly preferably, the device 10 is encompassed in a container treatment system. In the container treatment system, the objects 12 which are designed as containers can be transported by the device 10, for example to and/or away from the treatment stations.

It is possible, for example, that a plurality of treatment stations, for example filling, closing or labelling stations, are arranged adjacent to one another along a portion of the device 10. The device 10 can transport the objects 12, which are preferably designed as containers, to the plurality of treatment stations and/or hold said objects during the treatment by the treatment stations and/or transport said objects away after the treatment.

The device 10 has at least one guide track 14 and a plurality of movement devices 16, 18 for transporting the objects 12 along the transport path T.

The at least one guide track 14 is preferably closed or circulating. For example, the at last one guide track 14 can be circular, annular, oval or elliptical.

The movement devices 16, 18 are guided and preferably carried on the at least one guide track 14. For example, the movement devices 16, 18 can have in each case at least one guide element (not shown) which guides the respective movement device 16, 18 on the at least one guide track 14. The guide elements can be designed, for example, as rollers which roll along the at least one guide track 14, or sliding shoes which slide along the at least one guide track 14.

The movement devices 16, 18 are movable or drivable individually or independently of one another along the at least one guide track 14. Preferably, the device 10 can have a linear motor system (not shown), for example a long stator linear motor system or a short stator linear motor system, for individually driving the movement devices 16, 18.

For example, in a long stator linear motor system a plurality of long stator segments, which in each case have a plurality of electromagnets, can be arranged along the at least one guide track 14. The long stator segments can be brought into a magnetically operative connection with permanent magnets of the movement devices 16, 18 in order to drive or move the movement devices 16, 18 individually along the at least one guide track 14. However, in a short stator linear motor system, for example, a plurality of permanent magnets can be arranged along the at least one guide track 14, and the movement devices 16, 18 in each case have at least one electromagnet which can be brought into a magnetically operative connection with the permanent magnets for driving the movement devices 16, 18. However, also conceivable are completely different individual drive concepts for the movement devices 16, 18, for example at least one electric motor, which drives rollers of the movement devices 16, 18 for each movement device 16, 18.

The movement devices 16, 18 have first movement devices 16 and second movement devices 18. The first movement devices 16 and the second movement devices 18 are guided alternately one behind the other along the at least one guide track 14, preferably on the same guide track 14.

Each first movement device 16 and second movement device 18 form a pair for transporting (at least) one object 12. Successive objects 12 can be transported by successive pairs.

The object 12 can be positioned during transport along the transport path T between the first movement device 16 and the second movement device 18 of the respective pair. One of the movement devices 16, 18 of a pair can support the object 12 from the front relative to the transport path T, for example, and the other of the movement devices 16, 18 of the pair can support the object 12 from the rear relative to the transport path T, for example.

The movement devices 16, 18 of a pair can clamp or secure the object 12, for example, therebetween. The movement devices 16, 18 can transport the object 12 in a manner which is suspended or carried, for example when handling the neck of containers or by clamping a body of the object 12. However, it is also possible that the movement devices 16, 18 slide the object 12 slidably over, for example, a planar bottom surface (not shown), for example when handling the base of containers.

Preferably, the first movement devices 16 differ from the second movement devices 18. The difference is preferably how and/or where the respective movement device 16, 18 can support the object 12. The first movement devices 16 can differ from the second movement devices 18 relative to an arrangement and/or configuration of a support for the objects 12.

In the exemplary embodiment of FIGS. 1 and 2, the first movement devices 16 and the second movement devices 18 differ relative to the arrangement of the support for the objects 12, as described hereinafter in detail.

The first movement devices 16 can have in each case a first support portion 20 and a second support portion 22 for supporting the objects 12. The first support portion 20 can be oriented or turned in the direction of the transport path T. The second support portion 22 can be oriented or turned opposing the direction of the transport path T. The support portions 20, 22 can be oriented opposing one another.

The second movement devices 18 can have in each case a first support portion 24 and a second support portion 26 for supporting the objects 12. The first support portion 24 can be oriented or turned in the direction of the transport path T. The second support portion 26 can be oriented or turned opposing the direction of the transport path T. The support portions 24, 26 can be oriented opposing one another.

The first support portion 20 of the first movement device 16 can cooperate with the second support portion 26 of the second movement device 18 for transporting an object 12, as shown in FIG. 2. The second support portion 22 of the first movement device 16 can cooperate with the first support portion 24 of the second movement device 18 for transporting an object 12, as shown in FIG. 1.

The support portions 20, 22, 24 and 26 can be designed to be structurally the same. However, it is also possible, for example, that the support portions 20, 22 are designed structurally differently and the support portions 24, 26 are also designed structurally differently. Preferably, the support portions 20 and 26 are structurally the same and the support portions 22 and 24 are also structurally the same.

The support portions 20, 22, 24 and/or 26 can be designed, for example, in a V-shaped manner, as shown in FIG. 1. It is also possible that the support portions 20, 22, 24 and/or 26 are designed differently, for example in a ring segment-shaped or planar manner.

The first support portions 20 of the first movement devices 16 can be set back relative to the direction of the transport path T, and the second support portions 26 of the second movement devices 18 can be set back relative to a direction opposing the direction of the transport path T as shown in FIG. 1. Alternatively or additionally, the second support portions 22 of the first movement devices 16 can precede relative to a direction opposing the direction of the transport path T, and the first support portions 24 of the second movement devices 18 can precede relative to the direction of the transport path T, as also shown in FIG. 1.

For example, the movement devices 16, 18 in each case can have a carrier arm 28, 30. Preferably, starting from one respective base, the carrier arms 28, 30 can be bent back relative to one another in opposing directions.

The carrier arm 28 can carry the first support portion 20 and the second support portion 22 of the respective first movement device 16, preferably on an outer end of the carrier arm 28. The carrier arm 30 can carry the first support portion 24 and the second support portion 26 of the respective second movement device 18, preferably on an outer end of the carrier arm 30. The carrier arm 28 can be bent back opposing the direction of the transport path T, starting from a base of the carrier arm 28 to an end of the carrier arm 30 carrying the support portions 20, 22. The carrier arm 30 can be bent back in the direction of the transport path T, starting from a base of the carrier arm 30 to an end of the carrier arm 30 carrying the support portions 24, 26.

However, it is also possible that the movement devices 16 and/or 18 in each case have two carrier arms (not shown in the figures), one thereof carrying the respective first support portion 20 and/or 24 and the other carrying the respective second support portion 22 or 26. The carrier arm which carries the first support portion 20 can preferably be bent back opposing the direction of the transport path T, starting from a base. The carrier arm which carries the second support portion 22 can preferably be bent back opposing the direction of the transport path T, starting from a base. The carrier arm which carries the first support portion 24 can preferably be bent back in the direction of the transport path T, starting from a base. The carrier arm which carries the second support portion 26 can preferably be bent back in the direction of the transport path T, starting from a base.

A movement of the movement devices 16, 18 can be controlled by a control unit 32. For example, the control unit 32 can control an electrical energy supply of the electromagnets of the linear drive which drives the movement devices 16, 18 (for example a long stator linear drive or a short stator linear drive) as desired, in order to bring about the individual movement of the movement devices 16, 18.

The control unit 32 is configured to operate the device 10 selectively in a first operating mode and in a second operating mode. FIG. 1 shows the operation in the first operating mode. FIG. 2 shows the operation in the second operating mode. The control unit 32 can operate the device 10 for transporting objects 12 having a first format in the first operating mode, see FIG. 1, and for transporting objects 12 having a second format in the second operating mode, see FIG. 2. The first format can differ from the second format, for example, relative to a shape and/or a size of the objects. For example, the objects 12 transported in the first operating mode can be smaller or have a smaller diameter than the objects 12 transported in the second operating mode.

In the first operating mode and in the second operating mode, the objects 12 are transported in each case by a pair consisting respectively of one of the first movement devices 16 and one of the second movement devices 18. The pairs differ between the first operating mode and the second operating mode.

In the first operating mode, the pairs are formed such that the first movement device 16 is positioned in the direction of the transport path T upstream of the second movement device 18 of the respective pair. The front first movement device 16 of the respective pair can support the respective object 12 from the front relative to the direction of the transport path T, whereas the rear second movement device 18 of the respective pair can support the respective object 12 from the rear relative to the direction of the transport path T. For example, the objects 12 can be supported in each case between the second support portion 22 of the first movement devices 16 and the first support portion 24 of the second movement devices 18.

In the second operating mode, the pairs are formed such that the second movement device 18 is positioned in the direction of the transport path T upstream of the first movement device 16 of the respective pair. The front second movement device 18 of the respective pair can support the respective object 12 from the front relative to the direction of the transport path T, whereas the rear first movement device 16 of the respective pair can support the respective object 12 from the rear relative to the direction of the transport path T. For example, the objects 12 can be supported in each case between the second support portion 26 of the second movement devices 18 and the first support portion 20 of the first movement devices 16.

The variable bent-back portion of the carrier arms 28, 30, described by way of example, can permit, in particular in the second operating mode, a reduced expansion of the respective pairs including the object 12 to be respectively transported than might be possible without the bent-back portion. Thus the smallest possible spacing can be possible when transporting large objects.

Figure 3:
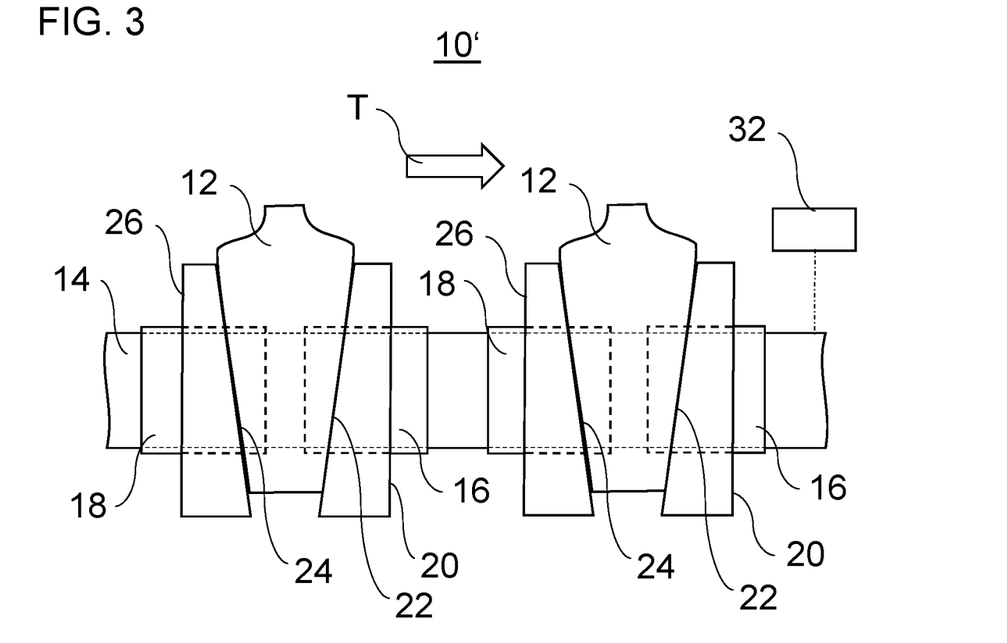
FIG. 3 shows a side view of a portion of a device for transporting objects in a first operating mode according to an exemplary embodiment of the present disclosure.
Figure 4:
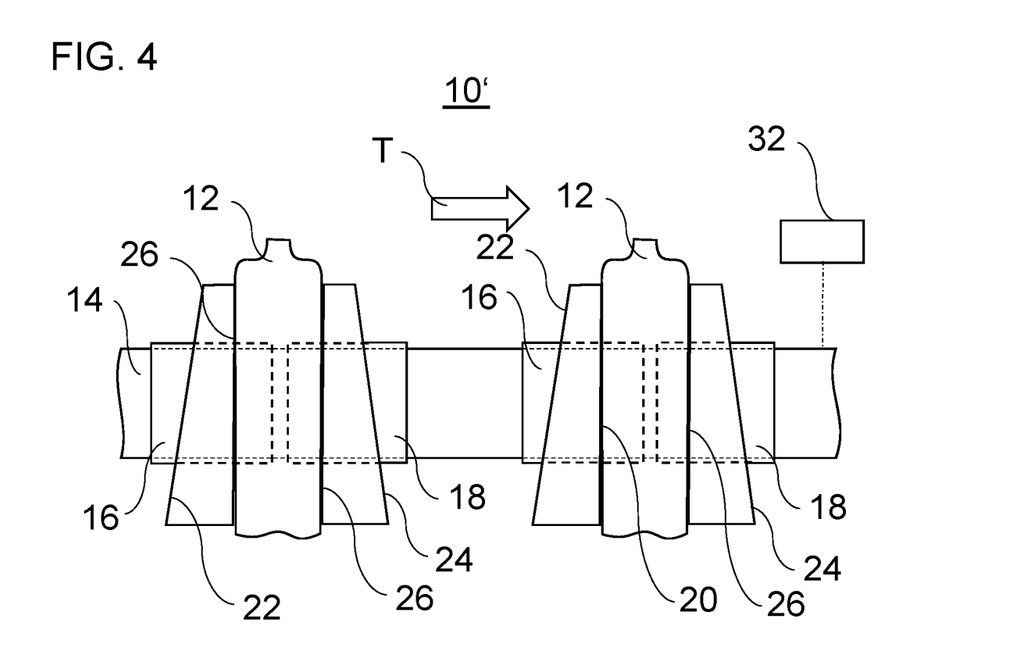
FIG. 4 shows a side view of the portion of the device of FIG. 3 in a second operating mode according to an exemplary embodiment of the present disclosure.

FIGS. 3 and 4 show a further device 10' for transporting objects 12 in a first operating mode (see FIG. 3) and in a second operating mode (see FIG. 4).

The device 10' is designed in a similar manner to the device 10 of FIGS. 1 and 2, so that hereinafter reference is made, in particular, to modifications of the device 10' relative to the device 10.

Preferably, the first movement devices 16 differ from the second movement devices 18 of the device 10' relative to the configuration or structure of a support for the objects 12.

The support portions 20 and 22 are designed structurally differently and the support portions 24 and 26 can also be designed structurally differently. Preferably, the support portions 20 and 26 are structurally the same and the support portions 22 and 24 also structurally the same.

For example, the support portions 20 and 26 can be designed as planar or ring segment-shaped vertical support surfaces. The support portions 22 and 24 can be designed, for example, as planar or cone segment-shaped support surfaces. Advantageously, for example, tapering or at least partially conical objects 12 can be transported in the first operating mode and cylindrical or cuboidal objects 12 can be transported in the second operating mode.

The exemplary embodiments of FIGS. 1 to 4 permit the transport of objects having different formats in different operating modes, as has been described. Further devices 110 or 110' which also permit a transport of objects 12 having very different formats are described hereinafter with reference to FIGS. 5 and 6; but this is in a different manner from the exemplary embodiments of FIGS. 1 to 4. It goes without saying that the techniques described with reference to FIGS. 5 to 6 can be combined with the techniques which are described with reference to FIGS. 1 to 4.

Figure 5:
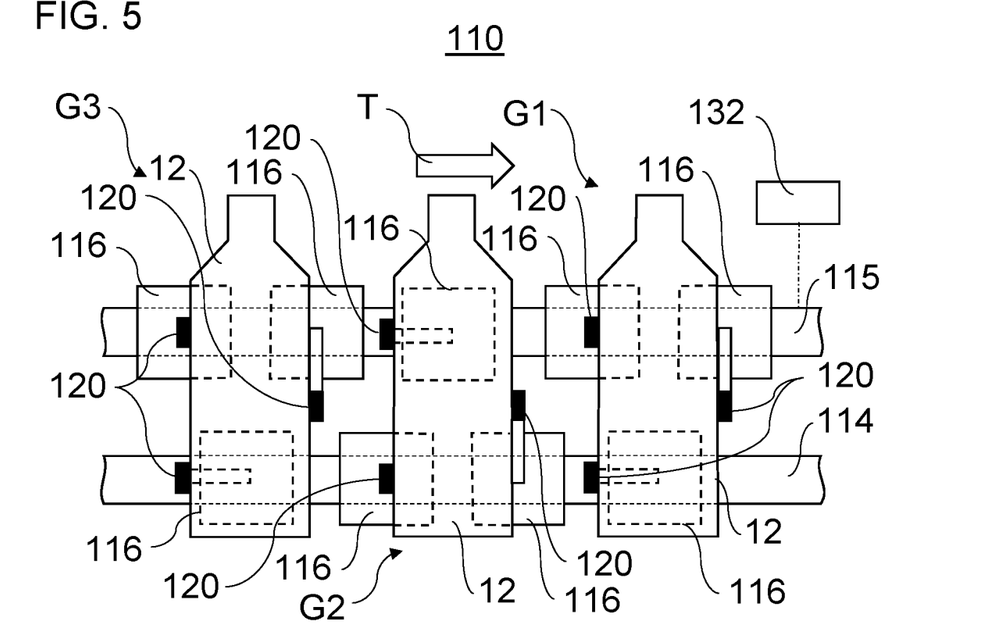
FIG. 5 shows a side view of a portion of a device for transporting objects according to an exemplary embodiment of the present disclosure.

FIG. 5 shows a portion of a device 110 for transporting objects 12. The objects 12 are preferably designed as containers. However, other objects 12 can also be transported. Particularly preferably, the device 110 is encompassed in a container treatment system, as has already been described, for example, with reference to FIG. 1.

The device 110 has at least one guide track 114, 115 and a plurality of movement devices 116 for transporting objects 12 along the transport path T.

The at least one guide track 114, 115 is preferably closed or circulating. For example, the at least one guide track 114, 115 is circular, annular, oval or elliptical. Preferably, a first guide track 114 and a second guide track 115 which extend substantially in parallel and are arranged, for example, one on top of the another are encompassed.

The movement devices 116 are guided and preferably carried on the at least one guide track 114, 115, as has already been described, for example, with reference to FIG. 1.

The movement devices 116 are movable or drivable individually or independently of one another along the at least one guide track 114, 115. Preferably, the device 110 can have at least one linear motor system (not shown), for example a long stator linear motor system or a short stator linear motor system, for individually driving the movement devices 116. For detailed designs of the drive of the movement devices 116, reference is made in turn to the corresponding designs of FIG. 1. The drive of the movement devices 116 can be controlled by a control unit 132.

It is possible that the first guide track 114 is assigned a first linear motor system, for example a long stator linear motor system or a short stator linear motor system, for individually driving those movement devices 116 which are guided along the first guide track 114.

It is also possible that the second guide track 115 is assigned a second linear motor system, for example a long stator linear motor system or a short stator linear motor system, for individually driving those movement devices 116 which are guided along the second guide track 115.

For example, the movement devices 116 can have in each case a support portion 120 for supporting the object 12. The support portions 120 of the three movement devices 116 of the respective groups can support the object at different points. The support portions 120 can be designed, for example, to be V-shaped, ring segment-shaped or planar. The support portions 120 can preferably be carried by a carrier arm of the respective movement device 116.

The control unit 132 can be configured to control the plurality of movement devices 116 such that one respective group G1, G2, G3 consisting of three of the plurality of movement devices 116 together transports an object 12 positioned, preferably secured, therebetween along the transport path T as far as a transfer region of the device 110 for transferring the object 12, for example, to a further conveyor or to a treatment station.

The object 12 is preferably held or supported in a three-point bearing of the three movement devices 116 (or the support portions 120 thereof) of the respective group G1, G2, G3. The support portions 120 of the three movement devices 116 of the group G1, G2, G3 can support the object 12, preferably at different vertical positions. For example, a shoulder, a central portion and a base portion of the object 12, which is designed as a container, can be supported by the three support portions 120.

The movement devices 16 of a group can clamp or secure the object 12, for example, between one another. The movement devices 116 can transport the object 12 in a manner which is suspended or carried, for example when handling the neck of containers or by clamping a body of the object 12. It is also possible, however, that the movement devices 116, for example, slide the object 12 slidably over a planar bottom surface (not shown), for example, when handling the base of containers.

The detail of FIG. 5 shows three groups G1, G2, G3 with in each case three movement devices 116. In order to achieve the narrowest possible spacing, the groups G1, G2, G3 can be configured, for example, as follows.

In the first group G1, one of the three movement devices 116 can be guided on the first guide track 114 and the other of the two movement devices 116 can be guided on the second guide track 115.

In the second group G2, which can directly follow the first group G1 relative to the direction of the transport path T, two of the three movement devices 116 can be guided on the first guide track 114 and the other movement device 116 can be guided on the second guide track 115.

The third group G3, which can directly follow the second group G2 relative to the direction of the transport path T, can in turn be formed in the manner of the first group G1, etc.

In the direction of the transport path T, groups can be alternately formed in the manner of the first group G1 and the second group G2.

Figure 6:
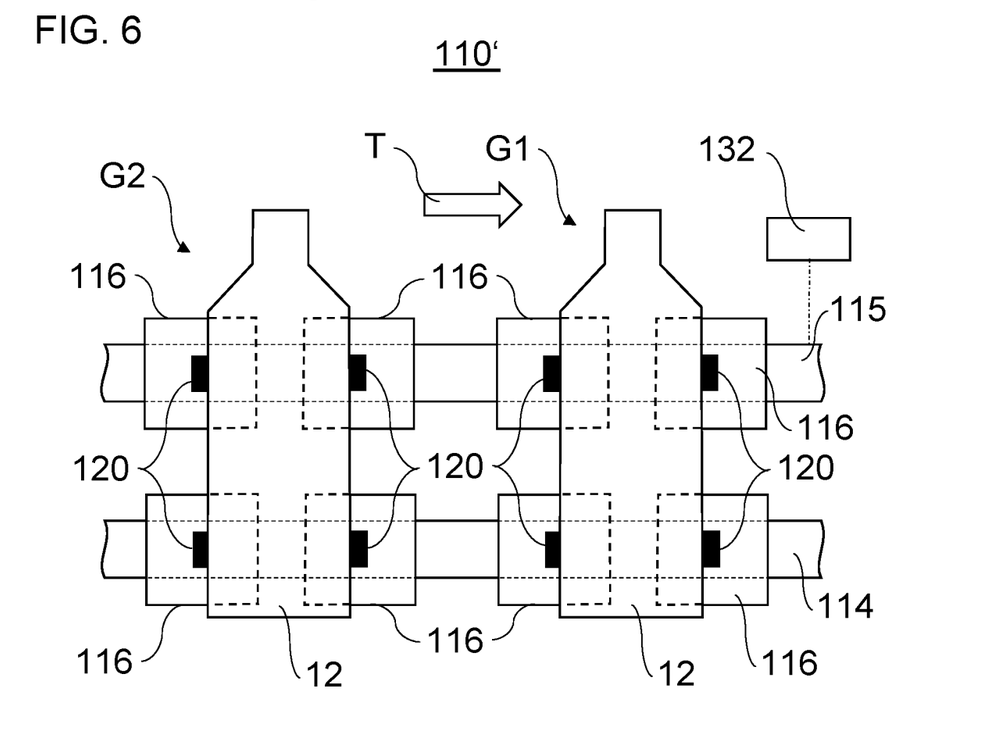
FIG. 6 shows a side view of a portion of a device for transporting objects according to an exemplary embodiment of the present disclosure.

FIG. 6 shows a further device 110' which is modified as follows, in particular relative to the device 110.

The control unit 132 can be configured to control the plurality of movement devices 116 such that in each case one group G1, G2, consisting of four of the plurality of movement devices 116, together transports an object 12 positioned, preferably secured, therebetween along the transport path T as far as a transfer region of the device 110 for the transfer of the object 12, for example, to a further conveyor or to a treatment station.

The object 12 is preferably held or supported in a four-point bearing of the four movement devices 116 (or of the support portions 120 thereof) of the respective group G1, G2. The support portions 116 of the four movement devices 116 of the group G1, G2 can preferably support the object 12 at least partially at different vertical positions.

The devices 110 and 110' of FIGS. 5 and 6 can assist the transport of different formats of the objects 12, in that an arrangement of the three or four movement devices 116 of the respective group G1, G2, G3 to one another is set as a function of the respective format of the object 12 to be transported by the control unit 132.

The invention is not limited to the above-described preferred exemplary embodiments. Rather, a plurality of variants and modifications, which also make use of the inventive idea and thus fall within the protected scope, are possible. In particular, the invention also claims protection for the subject and the features of the subclaims irrespective of the referenced claims. In particular, the individual features of the independent claims are disclosed in each case independently of one another. Additionally, the features of the subclaims are also disclosed independently of all of the features of the independent claims.

LIST OF REFERENCE NUMERALS

- 10 Device for transporting
- 12 Object
- 14 Guide track
- 16 First movement device
- 18 Second movement device
- 20 First support portion
- 22 Second support portion
- 24 First support portion
- 26 Second support portion
- 28 Carrier arm
- 30 Carrier arm
- 32 Control unit
- 110 Device for transporting
- 114 Guide track
- 115 Guide track
- 116 Movement device
- 120 Support portion
- 132 Control unit
- T Transport path
- G1 First group
- G2 Second group
- G3 Third group

What is claimed is:

1. A device for transporting objects along a transport path, comprising:
   at least one guide track;
   first movement devices and second movement devices for transporting the objects, wherein the first movement devices and the second movement devices are guided and individually drivable along the at least one guide track alternately one behind the other; and
   a control unit which is configured to operate the device in a first operating mode and in a second operating mode, wherein:
   in the first operating mode and in the second operating mode the objects are transported in each case by pairs which are formed in each case from one of the first movement devices and one of the second movement devices,
   in the first operating mode, the pairs are formed such that the first movement device is positioned in a direction of the transport path upstream of the second movement device of the respective pair, and
   in the second operating mode, the pairs are formed such that the second movement device is positioned in the direction of the transport path upstream of the first movement device of the respective pair,
   the first movement devices and the second movement devices in each case have a first support portion oriented in the direction of the transport path, and a second support portion oriented opposing the direction of the transport path, for supporting the objects during transport, and
   the first support portions of the first movement devices, the second support portions of the first movement devices, the first support portions of the second movement devices and the second support portions of the second movement devices are designed structurally the same.

2. The device according to claim 1, wherein:
   the first movement devices and the second movement devices are guided and individually drivable along the at least one guide track alternately one behind the other via a long stator linear drive or a short stator linear drive.

3. The device according to claim 1, wherein:
   the control unit is configured to operate the device for transporting objects having a first format in the first operating mode and for transporting objects having a second format, which differs from the first format.

4. The device according to claim 1, wherein:
   the first movement devices and the second movement devices differ from one another, or
   the first movement devices and the second movement devices differ from one another relative to at least one of an arrangement and a configuration of a support for the objects.

5. The device according to claim 1, wherein at least one of:
   the first support portion is V-shaped, ring segment-shaped or planar; and
   the second support portion is V-shaped, ring segment-shaped or planar.

6. The device according to claim 1, wherein at least one of:
   in the first operating mode, the objects are supported in each case between the second support portion of the first movement devices and the first support portion of the second movement devices; and
   in the second operating mode, the objects are supported in each case between the first support portion of the first movement devices and the second support portion of the second movement devices.

7. The device according to claim 1, wherein at least one of:
   the first support portions of the first movement devices are set back relative to the direction of the transport path and the second support portions of the second movement devices are set back relative to a direction opposing the direction of the transport path; and
   the second support portions of the first movement devices precede in a direction opposing the direction of the transport path and the first support portions of the second movement devices precede relative to the direction of the transport path.

8. The device according to claim 4, wherein:
the first movement devices and the second movement devices in each case have a carrier arm which carries the first support portion and the second support portion of the respective movement device; and
the carrier arms of the first movement devices and the carrier arms of the second movement devices are bent back in opposing directions to one another.

9. A device for transporting objects along a transport path, comprising:
at least one guide track;
a plurality of movement devices for transporting the objects, wherein the plurality of movement devices are guided and individually drivable along the at least one guide track; and
a control unit which is configured to control the plurality of movement devices such that in each case a group consisting of at least three of the plurality of movement devices, together transport an object positioned therebetween along the transport path as far as a transfer region of the device for the transfer of the object.

10. The device of claim 9, wherein:
the plurality of movement devices are guided and individually drivable along the at least one guide track via a long stator linear drive or a short stator linear drive.

11. The device according to claim 9, wherein:
the control unit is configured such that the groups are formed in each case from exactly three of the plurality of movement devices.

12. The device according to claim 11, wherein:
the at least one guide track has a first guide track and a second guide track which extend substantially in parallel and are arranged one above the other;
the control unit is configured:
to form a first group of the groups, such that one of the three movement devices of the first group is guided on the first guide track and the other two of the three movement devices of the first group are guided on the second guide track; and
to form a second group of the groups, such that two of the three movement devices of the second group are guided on the first guide track and the other of the three movement devices of the second group is guided on the second guide track.

13. The device according to claim 9, wherein:
the control unit is configured such that the groups in each case are formed from exactly four of the plurality of movement devices.

14. A container treatment system for treating containers, having a device according to claim 1.

15. A method for transporting objects having different formats via a device according to claim 1, the method comprising:
transporting one of the objects having a first format via a pair consisting of one of the first movement devices and one of the second movement devices, wherein the first movement device is positioned in a direction of the transport path upstream of the second movement device of the pair; and
transporting another one of the objects having a second format which differs from the first format via a pair consisting of one of the first movement devices and one of the second movement devices, wherein the second movement device is positioned in the direction of the transport path upstream of the first movement device of the pair.

16. A method for transporting objects having different formats via a device, which has at least one guide track and a plurality of movement devices for transporting the objects along a transport path, wherein the plurality of movement devices are guided and individually drivable along the at least one guide track, wherein the method comprises:
transporting objects having different formats in each case via a group consisting of at least three movement devices which together position an object therebetween along the transport path as far as a transfer region of the device for transferring the object, wherein for transporting the object an arrangement of the at least three movement devices to one another is set as a function of one respective format of the object to be transported.

* * * * *

UNITED STATES PATENT AND TRADEMARK OFFICE
CERTIFICATE OF CORRECTION

| | |
|---|---|
| PATENT NO. | : 12,110,193 B2 |
| APPLICATION NO. | : 17/985522 |
| DATED | : October 8, 2024 |
| INVENTOR(S) | : Michael Neubauer |

It is certified that error appears in the above-identified patent and that said Letters Patent is hereby corrected as shown below:

On the Title Page

Add item (30):
(30) Foreign Priority Application Data
Nov. 15, 2021 (DE) .................... 102021129702.8

Signed and Sealed this
Fifth Day of November, 2024

Katherine Kelly Vidal
*Director of the United States Patent and Trademark Office*